United States Patent [19]

Ishimoto et al.

[11] Patent Number: 4,996,639

[45] Date of Patent: Feb. 26, 1991

[54] DATA PROCESSOR INCLUDING AN A/D CONVERTER FOR CONVERTING A PLURALITY OF ANALOG INPUT CHANNELS INTO DIGITAL DATA

[75] Inventors: Satomi Ishimoto; Osamu Matsushima; Hajime Sakuma, all of Tokyo, Japan

[73] Assignee: NEC Corporation, Tokyo, Japan

[21] Appl. No.: 276,970

[22] Filed: Nov. 28, 1988

[30] Foreign Application Priority Data

Nov. 27, 1987 [JP] Japan ................................ 62-300614

[51] Int. Cl.⁵ .......................... G06F 5/00; G06F 13/12
[52] U.S. Cl. .................................. 364/200; 364/260.4; 364/241.2
[58] Field of Search ................................ 364/200, 900

[56] References Cited

U.S. PATENT DOCUMENTS

| | | | |
|---|---|---|---|
| 3,789,365 | 1/1974 | Ien | 364/200 |
| 3,883,852 | 5/1975 | Cotter | 364/900 |
| 4,075,691 | 2/1978 | Davis | 364/200 |
| 4,085,449 | 4/1978 | Walsh et al. | 364/900 |
| 4,315,314 | 2/1982 | Russo | 364/200 |
| 4,404,627 | 9/1983 | Marcantonio | 364/900 |
| 4,817,049 | 3/1989 | Bates et al. | 364/900 |

Primary Examiner—David Y. Eng
Attorney, Agent, or Firm—Foley & Lardner, Schwartz, Jeffery, Schwaab, Mack, Blumenthal & Evans

[57] ABSTRACT

A data processor includes a CPU and an A/D converter for converting one of several analog inputs into digital data. A data memory stores data designating analog inputs to be converted. A circuit, responsive to an A/D conversion completion signal from the A/D converter, supplies a macro service operation request to the CPU, which interrupts the CPU without having to save the contents of a CPU program counter and a CPU status register. Upon completion of the A/D conversion, the converted digital data are stored in a predetermined location, and CPU execution resumes.

9 Claims, 6 Drawing Sheets

DATA PROCESSOR INCLUDING AN A/D CONVERTER FOR CONVERTING A PLURALITY OF ANALOG INPUT CHANNELS INTO DIGITAL DATA

BACKGROUND OF THE INVENTION

The present invention relates to a data processor and, more particularly, to a microcomputer including an analog-to-digital converter (called hereinafter an "A/D converter") for converting a plurality of analog input channels int the corresponding digital data.

A microcomputer including an A/D converter can perform a data processing operation on an analog signal supplied thereto and is thus widely employed in various systems. When data processing on the analog signal is requested, a CPU (Central Processing Unit) in the microcomputer supplies a converting command to the A/D converter and then receives the converted data to perform the requested processing operation thereon.

There is a serious problem in the operation of the CPU after supplying the converting command to the A/D converter. The time required by the A/D converter to convert the analog signal into the digital data is considerably longer than the time required by the CPU to execute one instruction. A first prior art control method, in which subsequent processing operations by the CPU are stopped until the converted digital data is derived from the A/D converter, lowers the executing efficiency of the CPU. In order to solve this problem, a second prior art control method is employed in which the CPU continues to perform the subsequent operations after supplying the converting command to the A/D converter and the A/D converter generates an interruption request to the CPU when completing the converting operation. When the interruption request is generated, the CPU suspends operations in a main program routine and saves the contents of a program counter and a status register into a stack area of a data memory, and starts operation in an interruption program routine. The program counter is used for reading each instruction out of a program memory and the status register stores status data representative of an executing condition of the CPU. In accordance with the operation in the interruption program routine, the CPU reads the converted data from the A/D converter and transfers it to a predetermined destination area of the data memory. When the operation in the interruption program routine is completed, the CPU returns the saved contents to the program counter and the status register, and then resumes the operation in the main program routine. Thus, the second control method can enhance the execution efficiency of the CPU. However, in order for the CPU to start to execute the interruption program routine and resume the suspended main program routine, overheads are required for saving the contents of the program counter and the status register and for returning the saved contents thereto, respectively. For this reason, this control method restricts the execution efficiency and processing capability of the CPU.

In order to overcome the drawbacks of the first and second control methods, therefore, a new control method has been disclosed in a copending application Ser. No. 06,707,617 filed on Mar. 4, 1985. This control method performs the operation responsive to the completion of the A/D conversion, i.e. the transfer of the converted data to the destination area, without intervention of any user's program operation. More specifically, the microcomputer disclosed in the above copending application is constructed to perform two types of interruption operation, the first one of which is executed by use of a user's interruption program and is thus required to save the contents of the program counter and the status register and the second one of which is executed by without use of a user's interruption program by holding the contents of the program counter and status register. When the A/D converter generates the interruption request by designating the second type of interruption operation, the CPU suspends the program operation which is currently being executed, inhibits the contents of the program counter and status register from being varied, and then transfers the converted data to the destination area without saving the contents of the program counter and status register and by holding them as they are. After the converted data is transferred to the destination area, the CPU allows the program counter and status register to change to resume the suspended program operation. The second type of interruption operation is also called "macro service operation". With to the macro service operation, the above-mentioned overheads are not required, so that the execution efficiency and processing capability of the CPU are enhanced remarkably.

However, the above copending application discloses the macro service operation for a single analog input channel. Some systems are required to process a plurality of analog input channels, and two or more channels thereof may be simultaneously subjected to the conversion request to perform a desired operation.

SUMMARY OF THE INVENTION

Therefore, an object of the present invention is to provide a microcomputer performing a macro service operation for a plurality of analog input channels.

Another object of the present invention is to provide a data processor which can transfer converted data of plural analog input channels to respective destination areas in a data memory without intervention of and user's program operation.

Still another object of the present invention is to provide an improved data processor including an A/D converter for a plurality of analog inputs.

A data processor according to the present invention comprises a CPU executing a program stored in a program memory, an A/D converter converting a selected one of a plurality of analog inputs into digital data and generating a completion signal representative of completion of a converting operation, storage means for temporarily storing designation data for designating one or more analog inputs to be converted, and means responsive to the completion signal for supplying a macro service operation request to the CPU. The CPU includes execution means responsive to the macro service operation request for suspending the execution of the program and for executing a macro service operation by holding the suspended program executing conditions. The execution means includes means for transferring the digital data to a predetermined destination area, means for detecting the designation data stored in the storage means to produce selection data for selecting an analog input to be next converted, and means for setting the selection data into the A/D converter, wherein the A/D converter selects one of the analog inputs in response to the selection data applied thereto and converts the selected analog input into the digital data and the CPU resumes the execution of the program which has been suspended.

Thus, A/D conversion for a plurality of analog inputs can be designated and reserved simultaneously, and the execution of the A/D conversion of the respectively designated analog inputs and the transfer of the respective converted data can be performed in a sequential manner by the macro service operation without intervention of any user's program and without any overhead.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENTS

Figure 1:
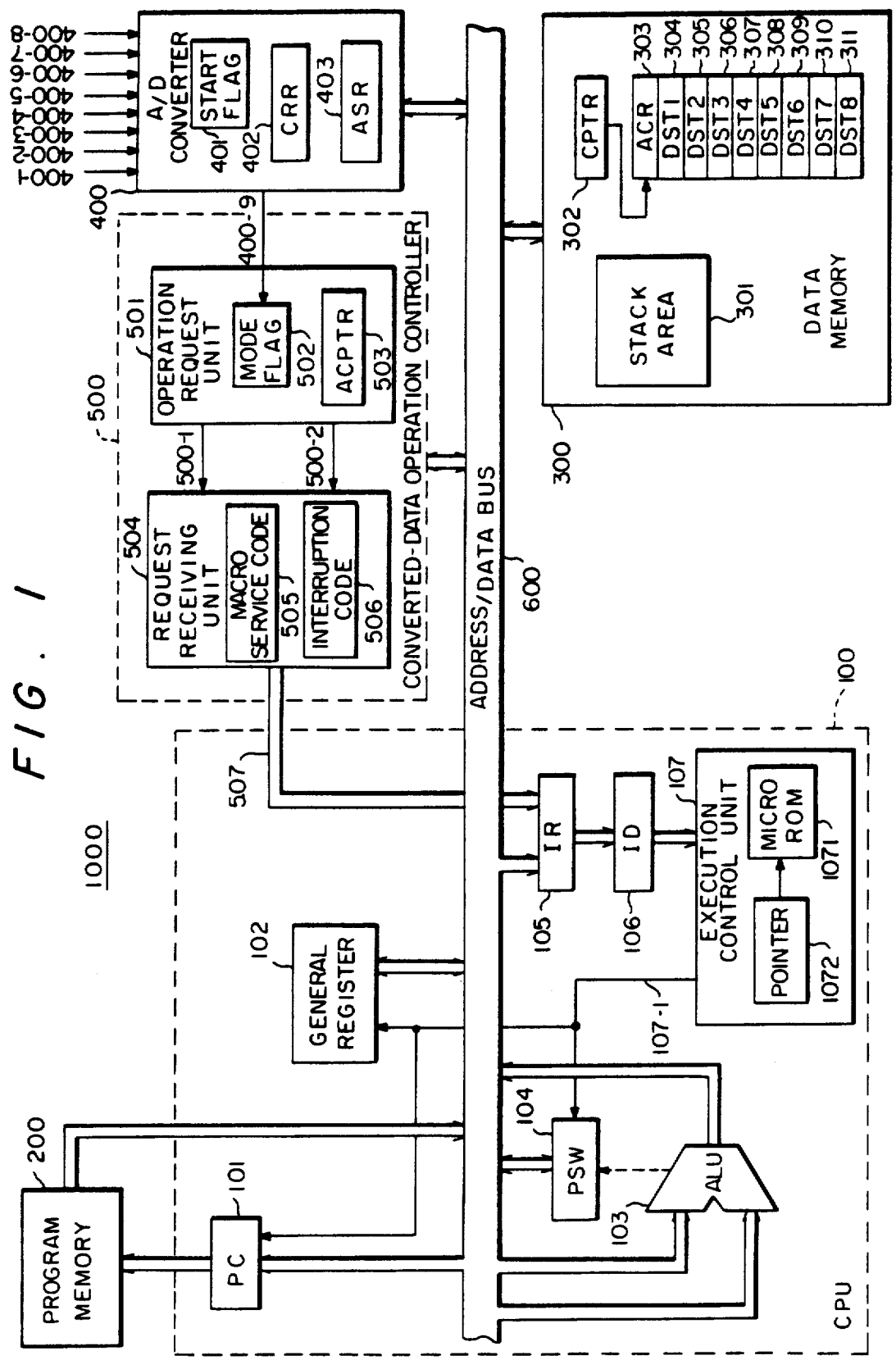
FIG. 1 is a block diagram representative of an embodiment of the present invention.

Referring to FIG. 1, a microcomputer 1000 according to an embodiment of the present invention includes a CPU (Central Processing Unit) 100. A program to be executed by the CPU 100 is stored in a program memory 200. This program includes a main operation routine and one or more interruption operation routines and is developed by a user of the microcomputer 1000. The CPU 100 includes a program counter (PC) 101 indicating an address of an instruction to be executed in the program of the program memory 200, an instruction register (IR) 105 stored with an instruction read from the program memory 200, an instruction decoder (ID) 106 decoding the instruction from the IR 105 and producing various control signals, an execution control unit 107 responding to the control signals from the ID 106 to control the whole operation of the microcomputer 1000, an arithmetic and logic unit (ALU) 103 performing an arithmetic and/or logic operation, a status register (PSW) 104 storing information representative of an execution condition of the CPU 100, and a general purpose register set 102, which are interconnected via an address/data bus 600. The execution control unit 107 includes a micro-ROM (Read Only Memory) 1071 and a pointer 1072 pointing out an address of the micro-ROM 1071. The micro-ROM 1071 stores a microprogram including a string of microinstructions for a macro service operation which will be described later in detail. Through the address/data bus 600, a data memory 300, an A/D converter 400 and a converted-data operation controller 500 are also interconnected.

The A/D converter 400 includes a start flag 401, a converted result register (CRR) 402 and a selection data register (ASR) 403 and starts to execute the A/D conversion when the start flag 401 is set. The A/D converter 400 is supplied with eight channels of analog inputs 400-1 to 400-8, one of which is selected in response to the selection data stored in the ASR 403. The converted digital data of the selected analog input is stored into the CRR 402. When the A/D conversion is completed, the A/D converter 400 generates a completion signal 400-9 which is in turn transmits to the converted-data operation controller 500. In this embodiment, one of the analog inputs 400-1 to 400-8 is selected in response to the selection data of the ASR 403 as shown in the following TABLE:

TABLE

| Selection Data of ASR 403 | | | Selected Analog Input |
|---|---|---|---|
| 0 | 0 | 0 | 400-1 |
| 0 | 0 | 1 | 400-2 |
| 0 | 1 | 0 | 400-3 |
| 0 | 1 | 1 | 400-4 |
| 1 | 0 | 0 | 400-5 |
| 1 | 0 | 1 | 400-6 |
| 1 | 1 | 0 | 400-7 |
| 1 | 1 | 1 | 400-8 |
| (MSB) | | (LSB) | |

Figure 2:
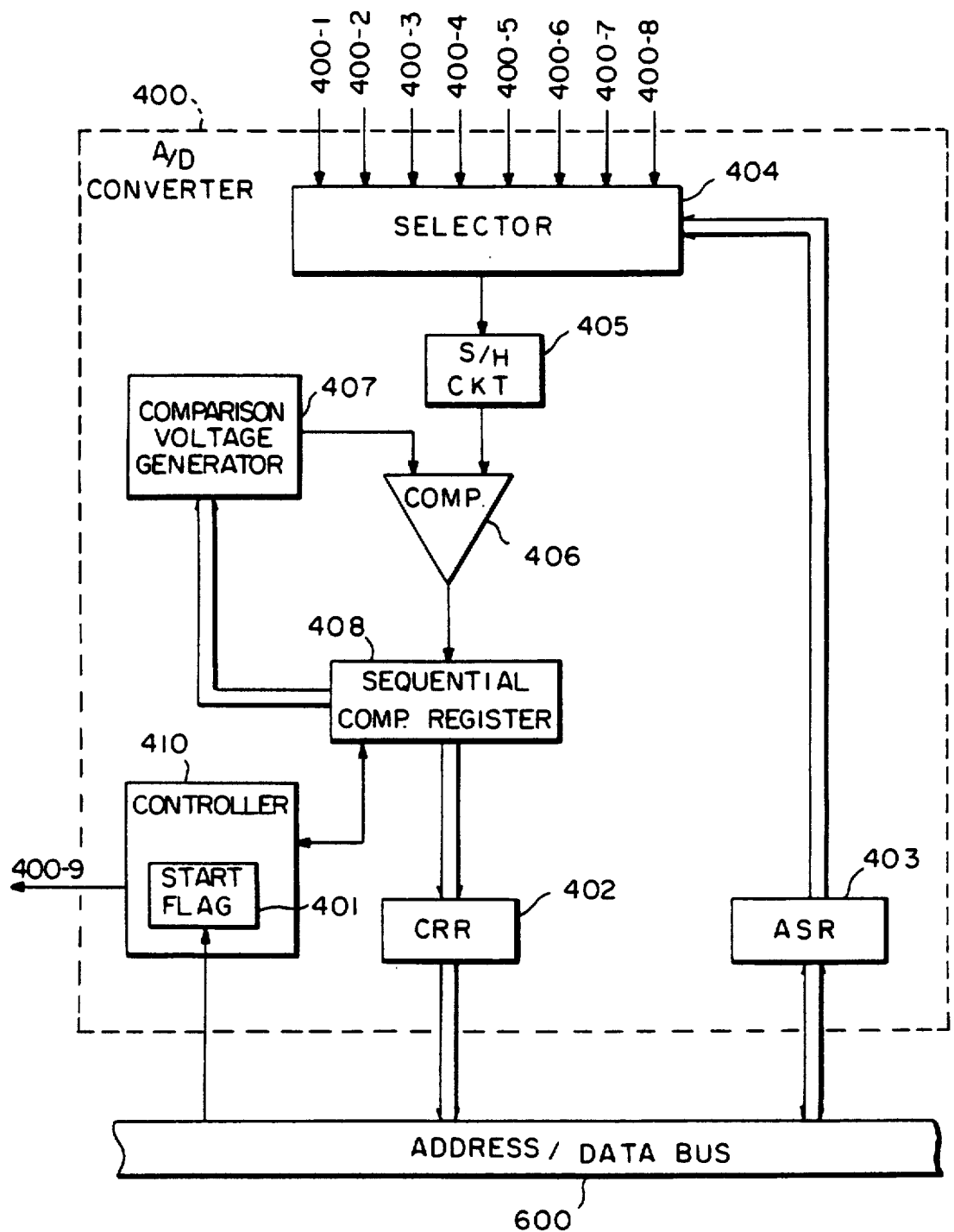
FIG. 2 is a block diagram representative of an A/D converter shown in FIG. 1.

Although A/D converters of various types are proposed and put into practical use, an A/D converter of the sequential comparison type is shown in FIG. 2 as an example. The A/D converter 400 of this type further includes a selector 404, a sample/hold circuit 405, a comparator 406, a comparison voltage generator 407, a sequential comparison register 408 and a controller 410, as well know in the art. The controller 410 starts the A/D converting operation when the start flag 401 is set, and generates the completion signal 400-9 when the converted digital data is stored into the CRR 402. Further detailed description of the A/D converter of this type will be omitted since the circuit operation thereof is well-known in the art.

Turning back to FIG. 1, the completion signal 400-9 is supplied to an operation request unit 501 of the controller 500. This unit 501 includes a mode flag 502 for designating either one of a macro service operation and an interruption operation on the converted digital data and a channel pointer address register (ACPTR) 503 storing an address of a channel pointer (CPTR) 302 which will be described later. In response to the completion signal 400-9, the operation request unit 501 supplies an operation request signal 500-1 and an operation mode designation signal 500-2 to a request receiving unit 504. In the case of designating the macro service operation, the mode flag 502 is set to store the data of "1" and the mode designation signal 500-2 takes a high level (logic-1). In the case of designating the interruption operation, on the other hand, the mode flag 502 is reset to store the data of "0" and the signal 500-2 takes a low level (logic-0). Since the mode flag 502 can be accessed, the user can designate the operation mode to be the macro service operation or the interruption operation. The request receiving unit 504 responds to the request signal 500-1 and detects the level of the mode designation signal 500-2. When the signal 500-2 is of the high level, the unit 504 transfers a macro service code stored in a register 505 to the instruction register (IR) 105 via an operation request bus 507. On the other hand, when the signal 500-2 is of the low level, an interruption code stored in a register 506 is transferred to the IR 105 via the bus 507. The interruption code includes a vector address for an interruption program routine stored in the program memory 200. The registers 503, 505 and 506 are inhibited from being accessed by the user.

The data memory 300 includes a stack area 301 into which the contents of PC 101, PSW 104 and register set 102 are saved in response to the interruption operation request, eight destination areas (DST1 to DST8) 304 to 311 to which the converted digital data of the analog inputs 400-1 to 400-8 are respectively transferred, a converted channel register (ACR) 303 storing channel designation data for designating one or more analog inputs to be converted, and a channel pointer (CPTR) 302 storing an address of the ACR 303. The ACR 303 has an 8-bits construction, and the respective bits thereof correspond to the respective ones of the analog inputs 400-1 to 400-8. Therefore, when the A/D conversion of the first, fifth and seventh analog inputs 400-1, 400-5 and 400-7 is requested, for example, the data of "10001010" is set into the ACR 303. In this embodiment, the address of the ACR 303 can be selected by the user, but the ACR 303 and the destination areas 304 to 311 are allotted to consecutive addresses, respectively. The address of the CPTR 302 is fixed.

Next, description of an operation of the microcomputer 1000 will be made in the following. Instructions for the program stored in the memory 200 are read out and executed sequentially by the CPU 100 using the PC 101. By executing an instruction for storing data into the ACR 303 and an instruction for storing data into the CPTR 302, the ACR 302 is stored with the channel designation data in which bit or bits corresponding to the analog input or inputs to be converted are set to "1" and the CPTR 302 is stored with the address of the ACR 302. In order to designate the macro service operation, the mode flag 502 is set to "1" by an instruction from the memory 200. When an instruction for setting the start flag 401, i.e. conversion start instruction, is read from the memory 200 and executed by the CPU 100, the selection data responsive to the channel designation data of the ACR 303 is stored into the ASR 403 and the start flag 401 is set. In this embodiment, the conversion priority order of the first to eight analog inputs 400-1 to 400-8 is designed to be in that order. Assuming that the ACR 303 stores the channel designation data of "10001010", therefore, the selection data of "000" for selecting the first analog input 400-1 is set into the ASR 403. Thus, the A/D converter 400 selects the first analog input 400-1 and starts the A/D converting operation. Access to the program memory 200 is allowed during the converting operation by the A/D converter 400. Accordingly, the CPU 100 continues to perform subsequent operations in parallel to the operation of the A/D converter 400.

When the conversion of the first analog input 400-1 is completed, the A/D converter 400 generates and applies the completion signal 400-9 to the operation request unit 501. The converted digital data is stored in the CRR 402. The unit 501 thereby produces the request signal 500-1 with the mode designation signal 500-2 being at the high level, since the mode flag 502 is in the set condition. In response thereto, the request receiving unit 504 transfers and sets the macro service code of the register 505 to the IR 105 via the bus 507. The macro service code is decoded by the ID 106 and supplied to the execution control unit 107. As a result, the execution control unit 107 produces and applies a hold signal 107-1 to the PC 101, PSW 104 and the register set 102 to inhibit the contents thereof from being varied and to hold the current contents thereof as they are. Further, the pointer 1072 is set with a leading address of the microprogram for the macro service operation stored in the micro-ROM 1071, so that the macro service operation starts to be executed. Thus, the CPU 100 suspends program operation and then performs the macro service operation without saving the contents of the PC 101, PSW 104 and register set 102 by holding the current contents thereof as they are.

Figure 3:
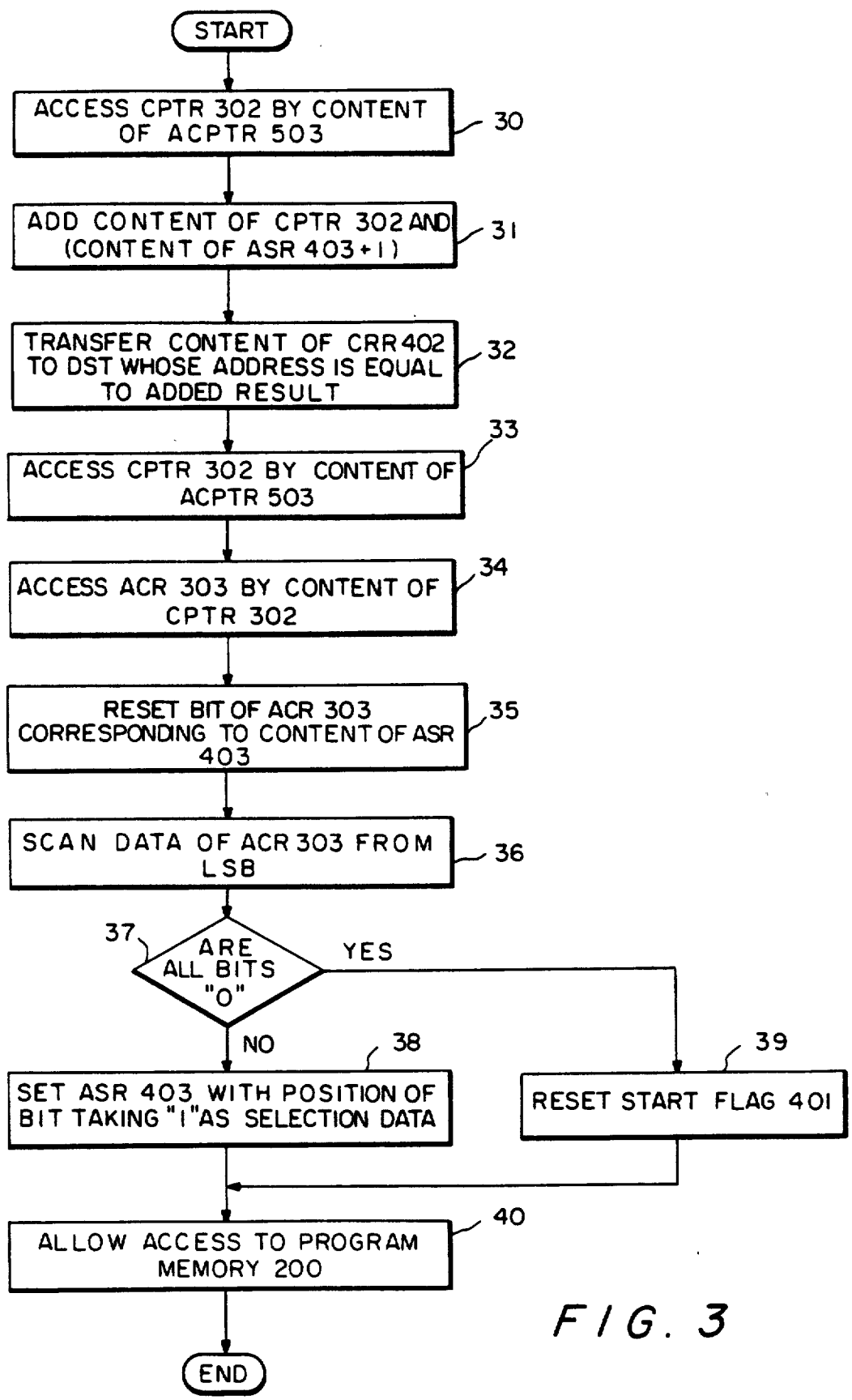
FIG. 3 is a flow chart representative of a macro service operation performed by a microcomputer shown in FIG. 1.

The macro service operation is performed in accordance with the flow chart shown in FIG. 3. Since the ACPTR 503 of the operation request unit 501 stores the address of the CPTR 302, the execution control unit 107 makes access to the CPTR 302 to read the content thereof by use of the address stored in the ACPTR 503 (Step 30). The content of the CPTR 302 indicates the address of the ACR 303, and the destination areas 304 to 311 are allotted respectively to the consecutive addresses from the address next the address of the ACR 303. That is, the address of the destination area to which the converted digital data are transferred is equal to the address obtained by adding the content of the ASR 403 plus 1 to the address of the ACR 303. Therefore, the execution unit 107 adds the content of the ASR 403 plus 1 to the content of the CPTR 302 by using the ALU 103 (Step 31). Since the content of the ASR 403 is "000", the added result is equal to the address of the first destination area DST 1 304. The execution control unit 107 makes access to the area 304 by use of the added result to transfer the converted digital data of the first analog input 400-1 to the first destination area 304 from the CRR 402 (Step 32). Thereafter, the execution control unit 107 makes access again to the CPTR 302 by use of the content of the ACPTR 503 (Step 33) and then makes access to the ACR 303 by use of the content of the CPTR 302 (Step 34). Since the converted digital data has been already transferred to the associated destination register, the execution control unit 107 resets the bit of the channel designation data of the ACR 303 which corresponds to the content of the ASR 403 (Step 35). The channel designation data is thereby changed to "00001010". The execution control unit 107 thereafter scans the content of the ACR 303 from the least significant bit (LSB) thereof by using the ALU 103 (Step 36) and detects whether or not another bit set to "1" is present in the channel designation data (Step 37). Since the fifth bit is set to "1", the position data thereof, "100", is set into the ASR 403 as new selection data by the unit 107 (Step 38). The A/D converter is thereby initialized and then selects the fifth analog input 400-5 and starts the A/D conversion. On the other hand, an access-enable command to the program memory 200 is produced (Step 40), so that the hold signal 107-1 is withdrawn. The PC 101, PSW 104 and register set 102 are thereby allowed to change the contents thereof so the CPU 100 restarts to read and execute the instructions from the program memory 200. Thus, the macro service operation responsive to the completion signal 400-9 is completed and the CPU resumes the suspended program operation.

When the A/D conversion of the fifth analog input 400-5 is completed, the signal 400-9 is generated again. In response thereto, the CPU 100 suspends the program operation by holding the contents of the PC 101, PSW 104 and register set 102 as they are and then performs the macro service operation. The converted digital data of the fifth analog input 400-5 is thereby transferred to the fifth destination area (DST 5) 308. The A/D conversion of the seventh analog input 400-7 is then started, and the CPU 100 restarts to execute the suspended program operation.

In the macro service operation for the converted digital data of the seventh analog input 400-7, the channel designation data of the ACR 303 is changed to all "0" by the execution of Step 35, so that it is detected that the content of the ACR 303 is all "0" in Step 37. Accordingly, the execution control unit 107 resets the start flag 401 of the A/D converter 400 to bring the converter 400 into a standby condition.

Thus, only by setting the start flag 401 while in the set state of the mode flag 502, is the transfer of the converted digital data to the corresponding destination area and the A/D conversion operation of the remaining analog input or inputs performed automatically by the macro service operation. Accordingly, the user is free from developing the interruption operation program for those operations, and moreover there is no overhead based on the starting and completion of the interruption operation program.

By checking the content the of the ACR, the microcomputer 1000 detects which one of the designated analog inputs has been already converted and whether or not all the designated analog inputs have been already converted. Moreover, since the CPU 100 executes the program operation in parallel with the converting operation by the A/D converter 400, the correction, change, addition or reservation of the analog input to be converted can be carried out arbitrarily. All of those operations can be performed in the main program routine, so that no interruption program routine is required.

On the other hand, when the completion signal 400-9 is generated in the reset state of the mode flag 502, the operation request unit 501 produces the request signal 500-1 with the low level mode designation signal 500-2. Accordingly, the request receiving unit 504 sets the interruption code 506 to the IR 105. In response thereto, the execution control unit 107 saves the contents of the PC 101, PSW 104 and register set 102 into the stack area 301 of the data memory 300 and thereafter sets into the PC 101 the vector address for the interruption program routine. The CPU 100 thereby executes the interruption operation in accordance with the interruption program routine When the interruption operation is completed, the saved contents are returned respectively to the PC 101, PSW 104 and register set 102 from the stack area 301, and the suspended main program routine is restarted.

Figure 4:
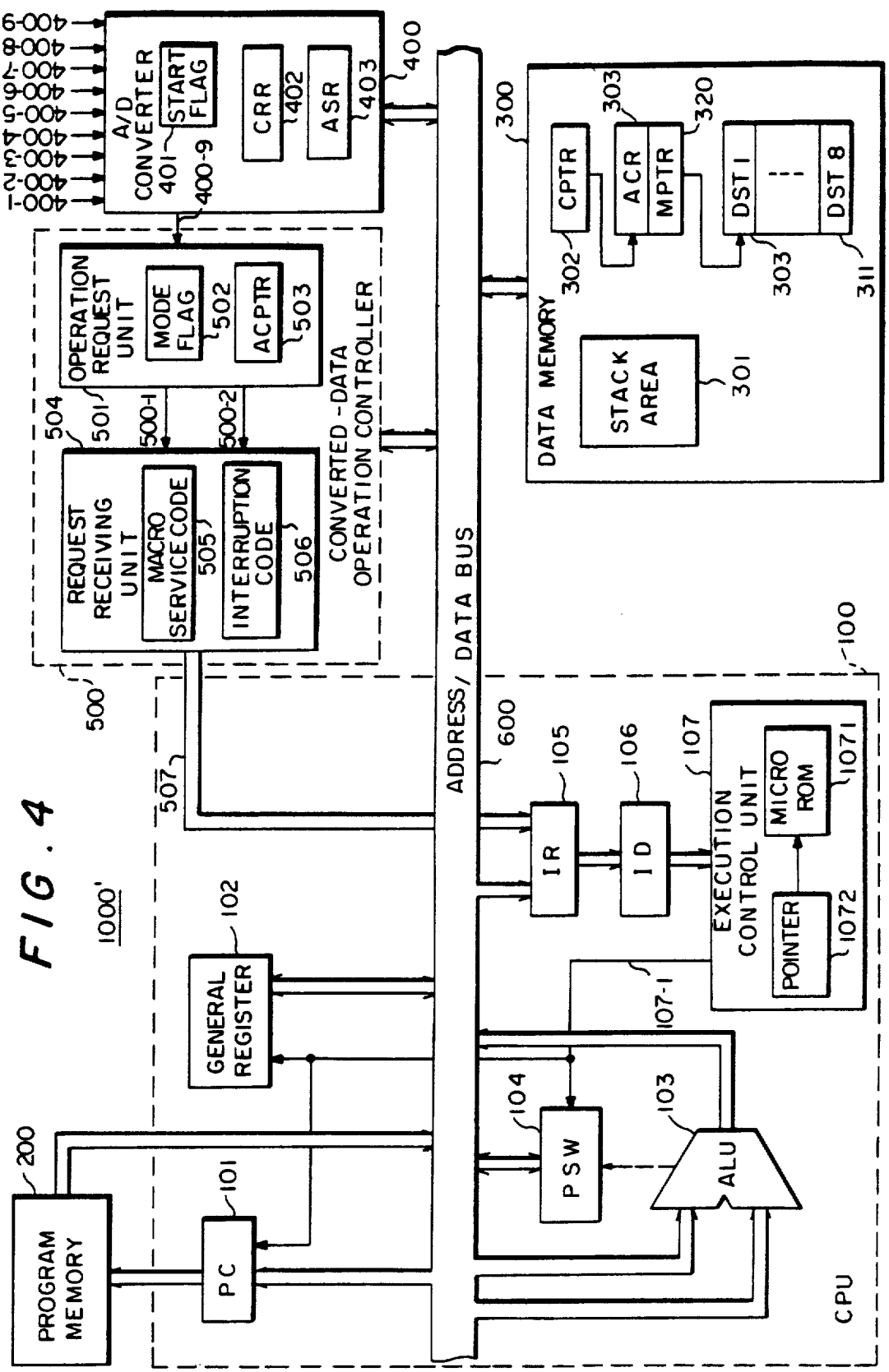
FIG. 4 is a block diagram representative of another embodiment of the present invention.
Figure 5:
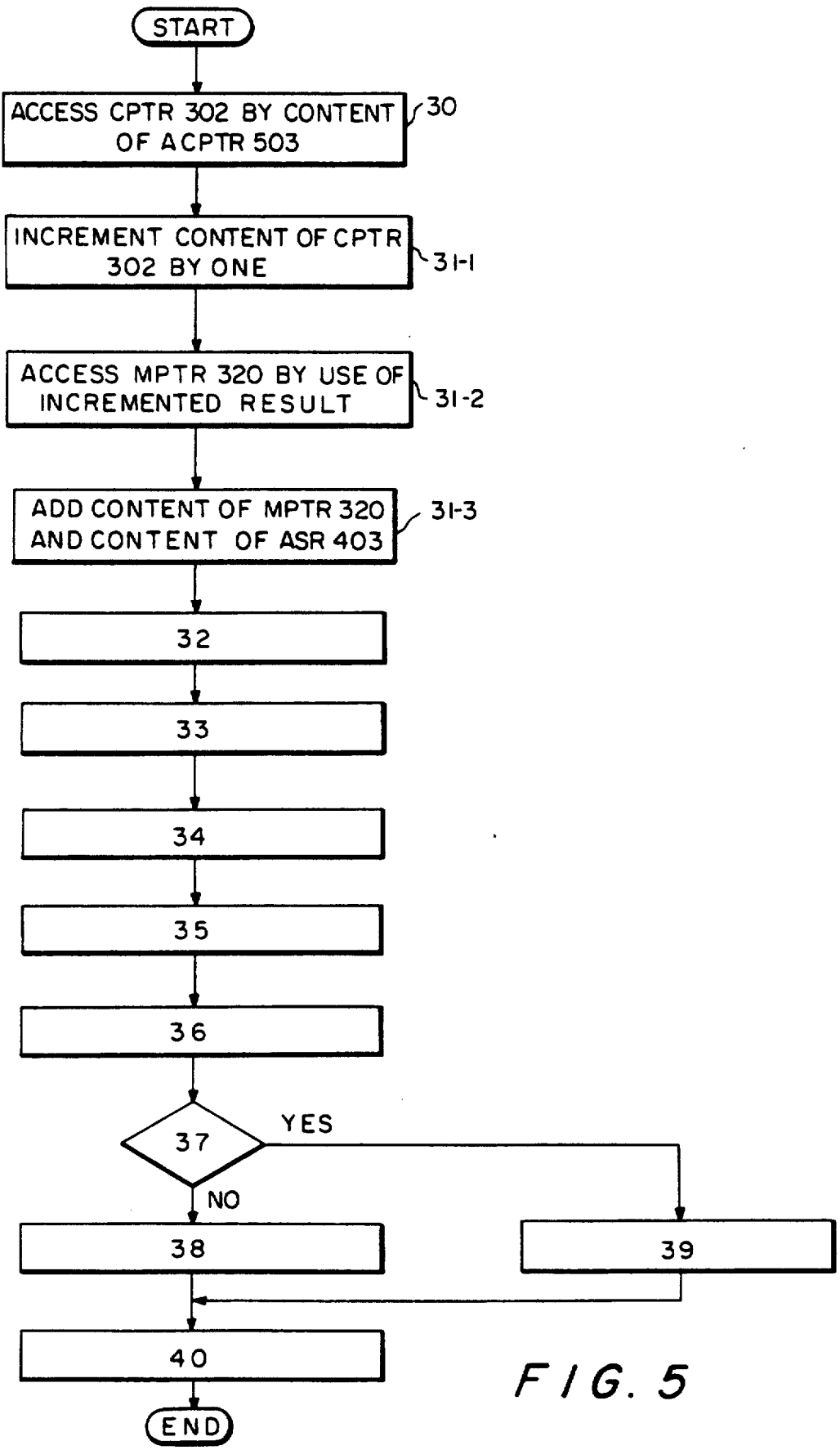
FIG. 5 is a flow chart representative of a macro service operation performed by a microcomputer shown in FIG. 4.

Referring to FIG. 4, there is shown a microcomputer 1000' according to another embodiment of the present invention, wherein the same constituents as those shown in FIG. 1 are denoted by the same reference numerals to not repeat further description thereof. In this embodiment, a memory pointer (MPTR) 320 is provided at an address next the address of the ACR 303, and the address of the first destination area (DST 1) 304 is stored in the MPTR 320. Therefore, the address of the destination areas 304 to 311 can be designed independently of the address of the ACR 303. The macro service operation in this microcomputer 1000' is basically the same as that shown in FIG. 3, but due to the presence of the MPTR 320, Steps 31-1, 31-2 and 31-3 are executed in place of Step 31 of FIG. 3, as shown in FIG. 5. More specifically, by Step 31-1, the content of the CPTR 302 is incremented by one by using the ALU 103. Since the incremented result is equal to the address of the MPTR 320, the MPTR 320 is accessed by use of the incremented result (Step 31-2), and the content of the MPTR 320 is added with the content of the ASR 403 by the ALU 103 (Step 31-3). The added result is equal to the address of the destination area to which the converted digital data are to be transferred. The Steps 32 to 40 are thereafter executed in the same manner as shown in FIG. 3. The MPTR 320 can take two or more bytes, so that the destination areas 304 to 311 can be allotted to arbitrary addresses of the data memory 300.

Figure 6:
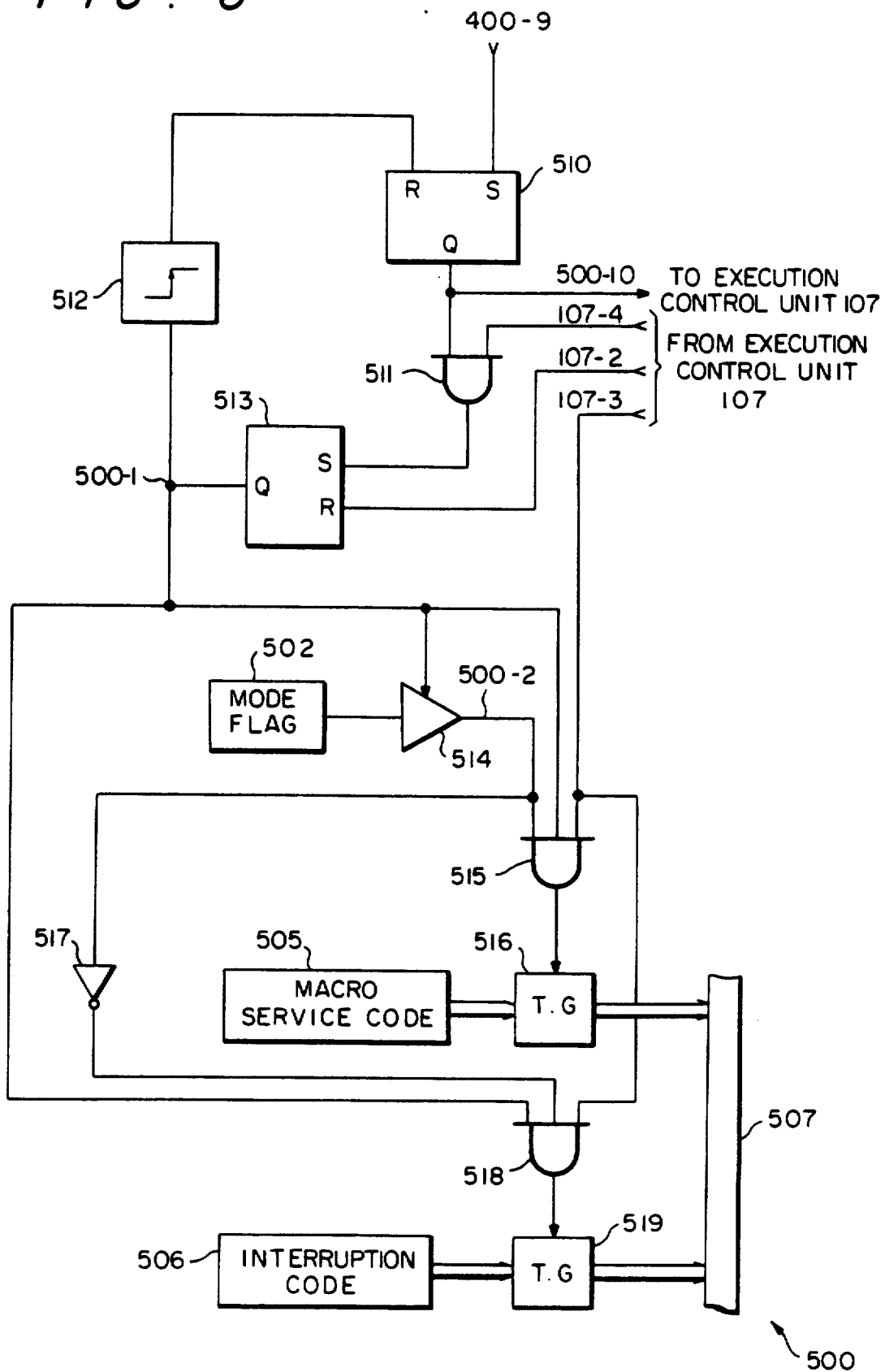
FIG. 6 is a circuit diagram representative of a converted-data operation controller shown in FIGS. 1 and 4.

Referring to FIG. 6, there is shown a circuit construction representative of one example of the converted-data operation controller 500 shown in FIGS. 1 and 4, wherein the ACPTR 503 is omitted in order to avoid the complication of the drawing. When the conversion completion signal 400-9 is generated, a flip-flop (called hereinafter an "F/F") 510 is set and the Q-output thereof is supplied to the execution control unit 107 as an operation request control signal 500-10. The execution control unit 107 produces an acknowledge signal 107-2 after a current instruction is completed, so that an F/F 513 is set through an AND gate 511. The Q-output of the F/F 513 is used as the operation request signal 500-1. The leading edge of this signal is detected by a detector 512 to reset the F/F 510. The F/F 510 thereby waits for the next conversion completion signal 400-9. On the other hand, the signal 500-1 activates a tri-state buffer 514, so that the content of the mode flag 502 is read out therefrom. The signal 500-1 is further supplied to AND gates 515 and 518. The AND gate 515 further receives the content of the mode flag 502, whereas the AND gate 518 receives the inverted content of the mode flag 502 via an inverter 517. Therefore, the AND gate 515 is opened by the set state of the mode flag 502, whereas the AND gate 518 is opened by the reset state of the mode flag 502. In response to an operation code request signal 107-3 from the execution control unit 107, one of transfer gates 516 and 519 is thereby brought into an open state, so that the macro service operation code 505 or the interruption operation code 506 is outputted to the bus 507. When the macro service operation or the interruption operation is completed, the execution control unit 107 produces an operation end signal 107-4 to reset the F/F 513. The buffer 514 and transfer gates 516 and 519 are thereby brought into a closed state.

As described above, the data processor or microcomputer according to the present invention can perform any one of the software interruption operation and the macro service operation in response to the A/D conversion completion signal, and moreover the macro service operation for a plurality of analog inputs is performed.

The present invention is not limited to the above embodiments, but may be changed and modified without departing from the scope and spirit of the invention. For example, the A/D converter 400 can be constructed to generate the conversion completion signal 400-9 by resetting the start flag 401 and in that case, a step for setting the start flag is inserted after Step 38 shown in FIG. 3 and Step 39 is omitted. Moreover, the program memory 200 and the data memory 300 can be constructed as a single memory. The request receiving unit 504 may transfer the macro service code or the interruption code to the IR 105 via the address/data bus 600 in place of the bus 507.

What is claimed is:
1. A data processor comprising:
(a) a program memory storing a program,

(b) a central processing unit including a program counter indicating an address of said program to be executed and a status register storing information representative of an execution state of said central processing unit and executing said program utilizing said program counter and said status register, (c) an analog-to-digital converter supplied with a plurality of analog inputs and including
  (1) first storage means for temporarily storing data for selecting one of said analog inputs,
  (2) selecting means, coupled to said first storage means, for selecting one of said analog inputs in response to data stored in said first storage means,
  (3) converting means, coupled to said selecting means, for converting a selected analog input into digital data, and
  (4) generating means, coupled to said converting means, for generating a completion signal representative of completion of analog-to-digital conversion, (d) second storage means for temporarily storing designation data for designating one or more of said analog inputs to be converted, said designation data including a plurality of bits which respectively correspond to said analog inputs, one or more bits corresponding to designated one or more analog inputs set to a first state and any remaining bits reset to a second state, and (e) signal means, responsive to said completion signal, for supplying a macro service operation request to said central processing unit, (f) said central processing unit further including execution means, responsive to said macro service operation request, for suspending execution of said program and for executing said macro service operation while holding a contents of said program counter and said status register unchanged without saving said contents and without accessing said program memory, (g) said execution means including
  (1) transfer means, operatively coupled to said converting means, for transferring said digital data to a predetermined designation area,
  (2) detecting means, operatively coupled to said second storage means, for detecting a position of bits of said designation data which are set to said first state in and for producing selection data for selecting another one of said analog inputs, to be next converted, in accordance with a detected bit position,
  (3) set means, operatively coupled to said first storage means, for setting said selection data into said first storage means to cause said analog-to-digital converter to convert another analog input into corresponding digital data, and
  (4) release means for allowing said program counter and said status register to change such that said central processing unit resumes operation of said program.

2. A data processor as claimed in claim 1, wherein said execution means further includes reset means for resetting a bit of said plurality of bits of said designation data, which corresponds to an analog input selected by data stored in said first storage means, from said first state to said second state.

3. A data processor as claimed in claim 2, wherein said execution means further comprises means for bringing said analog-to-digital converter into a standby condition when all of said plurality of bits of said designation data are reset to said second state.

4. A microcomputer comprising:
  a program memory storing a string of instructions;
  a central processing unit including a program counter which indicates an address of said program memory in which an instruction to be executed is stored, a status register storing information representative of an execution state of said central processing unit, and execution means for executing an instruction read from said program memory;
  an analog-to-digital converter including a plurality of input terminals supplied with a plurality of analog signals, a selection register temporarily storing selection data, selection means, coupled to said input terminals and to said selection register, for selecting one of said analog signals in response to said selection data, converting means, coupled to said selection means, for converting a selected analog signal into digital data, a result register, coupled to said converting means, for temporarily storing said digital data, and generator means, coupled to said converting means, for generating a conversion end signal when conversion of said selected analog signal is completed;
  an operation request controller, coupled to said generator means, for supplying a macro service code to said central processing unit in response to said conversion end signal; and
  a data memory including a designation area temporarily storing designation data which includes a plurality of bits corresponding to said analog inputs, one or more bits of said plurality of bits being set to a first state to designate one or more analog signals to be converted, a plurality of destination areas corresponding to said analog signals, and a pointer area storing address information concerning an address of one said destination areas;
  said central processing unit further including performing means for performing a macro service operation in response to said macro service code without accessing said program memory, said performing means including inhibiting means for inhibiting a first contents of said program counter and a second contents of said status register from being changed and for holding said first and second contents unchanged, designating means, responsive to said address data stored in said selection register and to said address information stored in said pointer area, for designating one of said destination areas, first transfer means for transferring said digital data stored in said result register to a designated designation area, detection means for detecting said designation data stored in said designation area and for producing new selection data for selecting a second analog signal to be next converted in accordance with a position of a bit of said designation data set to said first state, second transfer means for transferring said new selection data to said selection register to command said analog-to-digital converter to start a conversion operation of said second analog signal selected by said new selection data, and release means for allowing said first contents of said program counter and said second contents of said status register to change such that said central processing unit resumes executing instructions read from said program memory.

5. A microcomputer as claimed in claim 4, wherein said designation area and said destination areas are allocated to consecutive addresses and wherein said pointer area stores an address of said designation area, said designating means designating one of said destination areas by an address obtained by adding a content of said selection data plus one to a content of said pointer area.

6. A microcomputer as claimed in claim 4, wherein said destination areas are allocated to consecutive addresses and wherein said pointer area stores a leading address of said consecutive addresses, said designating means designating one of said destination areas by an address obtained by adding a content of said selection data to a content of said printer area.

7. A method of processing data comprising the steps of:

(a) executing a program in a central processing unit in accordance with instructions stored in a program memory;

(b) receiving a plurality of analog inputs;

(c) selecting a first analog input from said plurality of analog units;

(d) converting said first analog input into digital form to produce first digital data;

(e) generating a completion signal indicating completion of conversion of said first analog input;

(f) receiving said completion signal in said central processing unit;

(g) suspending execution of said program by said central processing unit in response to receiving said completion signal in said central processing unit;

(h) executing a macro service operation in said central processing unit in accordance with instructions stored in a second memory while holding a contents of a program counter and a status register of said central processing unit unchanged without saving said contents of said program counter and said status register in a separate memory location and without accessing said program memory;

(i) transferring said first digital data to a predetermined storage location utilizing said central processing unit; and (j) resuming execution of said program by said central processing unit.

8. A method of processing data as set forth in claim 7, further comprising the following steps after step (i) and before step (j):

selecting a second analog input from said plurality of analog inputs; and beginning conversion of said second analog input into digital form to produce second digital data.

9. A method of processing data as set forth in claim 7, further comprising the following step after step (i):

selecting a second analog input from said plurality of analog inputs;

and further comprising the following step after step (j):

beginning conversion of said second analog input into digital form to produce second digital data.

* * * * *